(12) United States Patent
Schiltz et al.

(10) Patent No.: US 9,327,907 B1
(45) Date of Patent: May 3, 2016

(54) CONVEYOR BELT POSITIVE DRIVE ROLLER

(71) Applicant: Precision, Inc., Pella, IA (US)

(72) Inventors: Gary Wayne Schiltz, Algona, IA (US); Brian Scott Schiltz, Algona, IA (US)

(*) Notice: Subject to any disclaimer, the term of this patent is extended or adjusted under 35 U.S.C. 154(b) by 0 days.

(21) Appl. No.: 14/645,607

(22) Filed: Mar. 12, 2015

(51) Int. Cl.
*B65G 23/06* (2006.01)
*B65G 39/07* (2006.01)
*B65G 45/12* (2006.01)

(52) U.S. Cl.
CPC ............ *B65G 23/06* (2013.01); *B65G 39/07* (2013.01); *B65G 45/12* (2013.01)

(58) Field of Classification Search
CPC ........ B65G 23/04; B65G 23/06; B65G 39/07; B65G 39/071; B65G 39/073; B65G 45/12
USPC ........................................................ 198/834
See application file for complete search history.

(56) References Cited

U.S. PATENT DOCUMENTS

| | | | | | |
|---|---|---|---|---|---|
| 5,170,883 | A | * | 12/1992 | Ledet | B23P 15/14 198/834 |
| 5,762,177 | A | * | 6/1998 | Baker | B65G 39/02 193/35 R |
| 6,938,754 | B2 | * | 9/2005 | Kanaris | B65G 39/073 198/494 |
| 7,975,840 | B2 | * | 7/2011 | Messick, Jr. | B65G 17/08 198/834 |
| 8,042,682 | B2 | * | 10/2011 | Ertel | B65G 23/06 198/834 |
| 8,579,774 | B2 | * | 11/2013 | Derscheid | A01F 15/18 198/835 |
| 8,701,875 | B2 | * | 4/2014 | Arai | B65G 23/06 198/834 |
| 9,022,209 | B2 | * | 5/2015 | Ragan | B65G 23/04 198/619 |
| 2013/0105283 | A1 | * | 5/2013 | Dudek | B65G 23/06 198/835 |

FOREIGN PATENT DOCUMENTS

JP        8326875        12/1996

OTHER PUBLICATIONS

Bohannon, George S., Serv-O-Link Corp.—"Drive Design Handbook", 7 pages, Apr. 2008. Apr. 30, 2008.
JP 8-326875—Sumitomo Bakelite Co. Ltd.—English Translation Dec. 10, 1996.

* cited by examiner

*Primary Examiner* — Leslie A Nicholson, III
*Assistant Examiner* — Keith R Campbell
(74) *Attorney, Agent, or Firm* — McKee, Voorhees & Sease, PLC (57) ABSTRACT

A conveyor belt system and a conveyor belt drive roller and method of making in which the drive roller comprises a cylindrical body having a circumference and opposite ends, a plurality of annular drive sections axially spaced apart by annular relief lands. The annular drive sections have circumferentially spaced apart lug grooves formed by raised portions extending parallel to the body axis. The lug grooves have opposite ends communicating with an annular relief land for discharge of waste material. A drive shaft with left and right knurling at opposite ends is press fitted into the body of the drive roller creating a balance resistance to movement of the shaft in opposite directions.

6 Claims, 9 Drawing Sheets

CONVEYOR BELT POSITIVE DRIVE ROLLER

BACKGROUND OF THE INVENTION

This invention relates to conveying devices. Specifically this invention relates to an improved conveyor belt positive drive roller.

An earlier conveyor belt drive roller is shown in U.S. Pat. No. 7,021,457.

Conveyors being used in the food industry have a particular emphasis on positive drive and tracking along with cleanliness and thus there is a need for a drive roller that is capable of providing the necessary rotational torque and is most importantly self-cleaning.

SUMMARY OF THE INVENTION

The drive roller of this invention will produce the required torque for the conveyor belt and while doing so will be self-cleaning making its use in the food industry ideal. The body of the drive roller is made from Delrin or Acetal plastic material rather than stainless steel allowing for easier cleaning and improved waste material release. This material also improves the slippage factor, which in dry installations tends to be much better than using stainless steel. Urethane material grips stainless steel too tightly, where Delrin or Acetal material works much better.

Safety is another advantage of this drive roller in that it has belt tracking flanges at opposite ends which retain the conveyor belt on the roller and keep fingers away from the belt and roller.

The roller axial shaft is preferably stainless steel and has left hand knurling on one hand and right hand knurling on the opposite end and is press fitted into the drive roller thereby creating a balanced resistance to movement of the shaft in opposite directions.

While the drive roller is substantially self-cleaning, a scraper may also be employed designed specifically for the drive roller of this invention.

The unique design of the drive roller includes a plurality of annular drive sections axially spaced apart by annular relief lands. The drive sections have circumferential spaced apart lug grooves formed by raised portions extending parallel to the body axis. The grooves have opposite ends communicating with an annular relief land. This design facilitates the self-cleaning of the drive roller while in operation by waste product in the lug grooves moving to either end thereof into a relief land whereby it drops away from the conveyor belt. The belt tracking flange at opposite ends of the drive roller centers the belt on the roller and keeps fingers away from the roller and belt thereby avoiding injury.

DETAILED DESCRIPTION OF THE PREFERRED EMBODIMENTS

Figure 1:
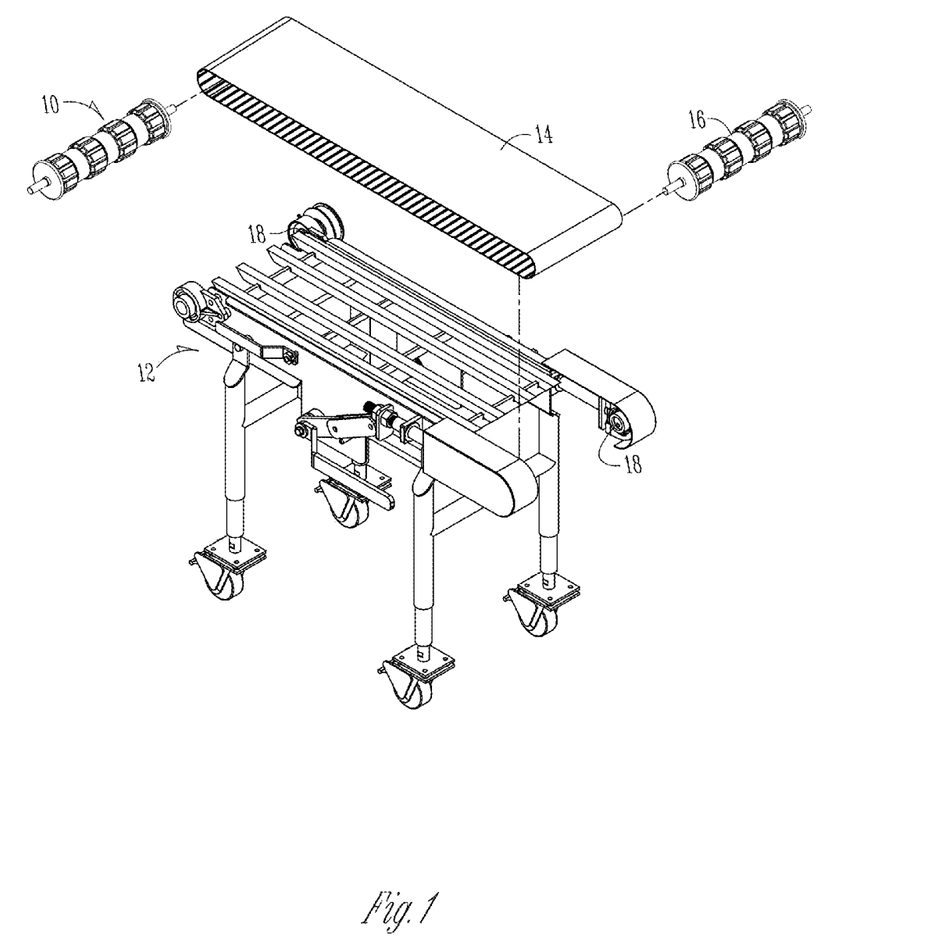
FIG. 1 is an exploded view of a conveyor system assembly using the belt drive roller of the current invention.

The conveyor drive roller of this invention is seen in FIG. 1, an exploded view showing the conveyor support assembly 12 and the conveyor belt 14. A follower idler 16 may be a duplicate of the drive roller 10 or of a conventional design. The drive roller 10 and follower idler 16 are mounted in the roller bearings 18 at opposite ends of the conveyor belt support assembly 12.

Figure 2:
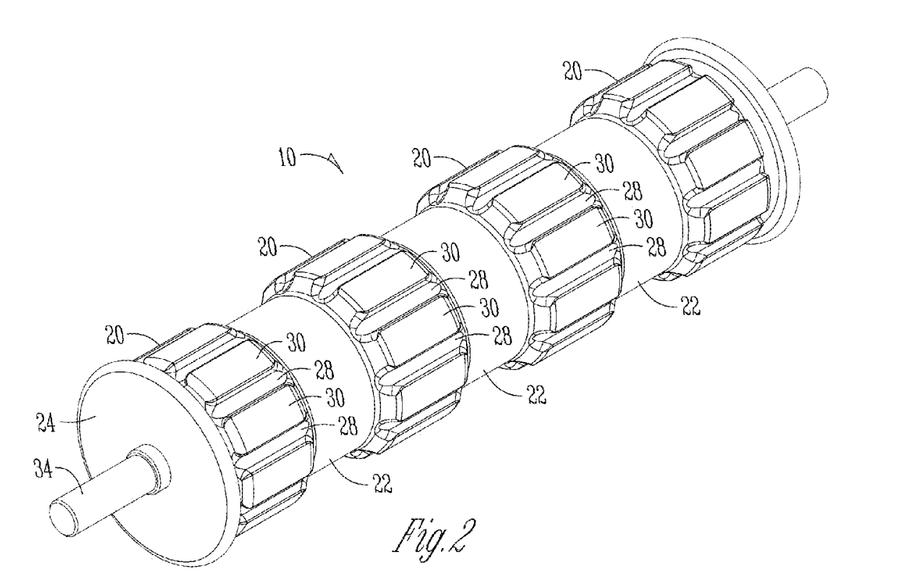
FIG. 2 shows one embodiment of a conveyor belt drive roller of the current invention.

The drive roller 10 includes a plurality of drive sections 20 spaced apart by middle relief lands 22. The roller 10 at opposite ends includes a belt tracking flange 24 and an end relief lands 26 substantially smaller in axial width than the middle relief lands 22.

The drive sections 20 have U-shaped lug grooves 28 formed by raised portions 30 extending parallel to the body axis. The lug grooves 28 communicate through their opposite ends with the relief lands 22 and 26 for release of waste product. The raised portions 30 of the drive sections 20 have end edges 32 sloping into the middle relief lands 22.

The bottom of the concave or U-shaped lug grooves 28 are spaced substantially the same distance from the body axis as the contiguous relief lands 22 and 26. Each of the drive sections 20 has an axial width substantially equal to the axial width of the relief lands 22 therebetween. The lug grooves 28 are formed by circumferential spaced apart axially extending raised portions 30. It is further seen that the raised portions 30 extend the axial length of the drive sections 20 and have a circumferential width greater than the circumferential width of each of the adjacent lug grooves 28.

Figure 8:
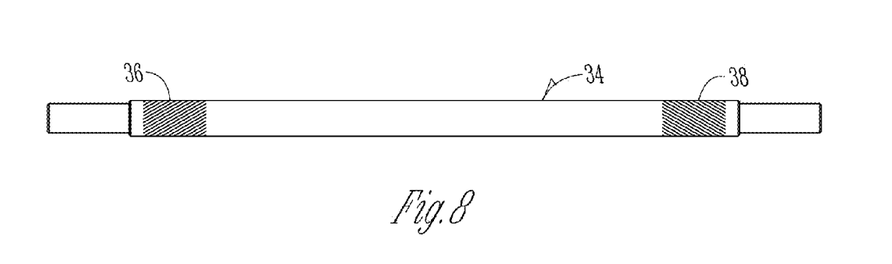
FIG. 8 is a top view of the shaft press fitted into the drive roller showing the left and right hand knurls at opposite ends of the shaft.
Figure 9:
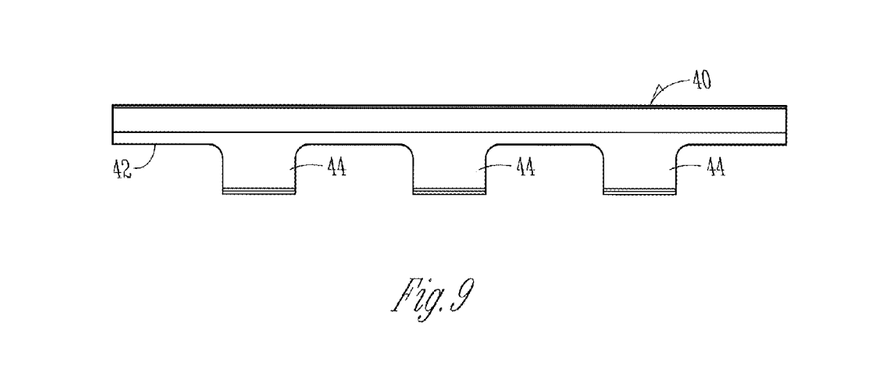
FIG. 9 is a top view of the scraper in FIG. 7.
Figure 10:
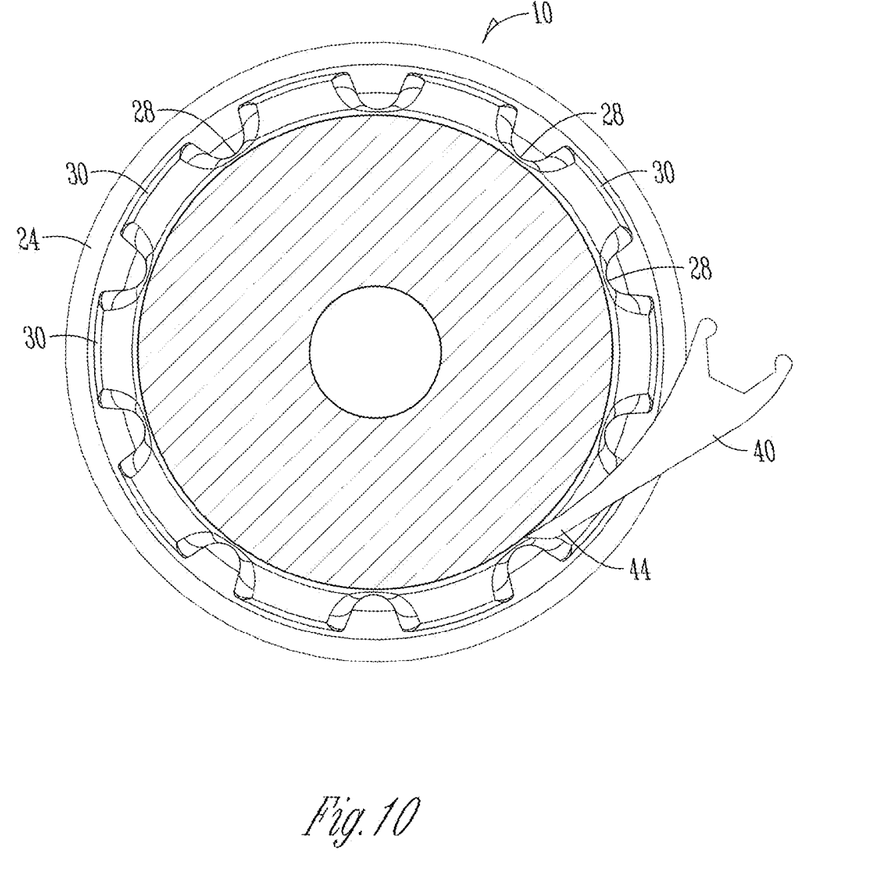
FIG. 10 is a sectional view of the drive roller of FIG. 7 showing the scraper in engagement with the drive roller taken along lines 10-10 in FIG. 7.
Figure 11:
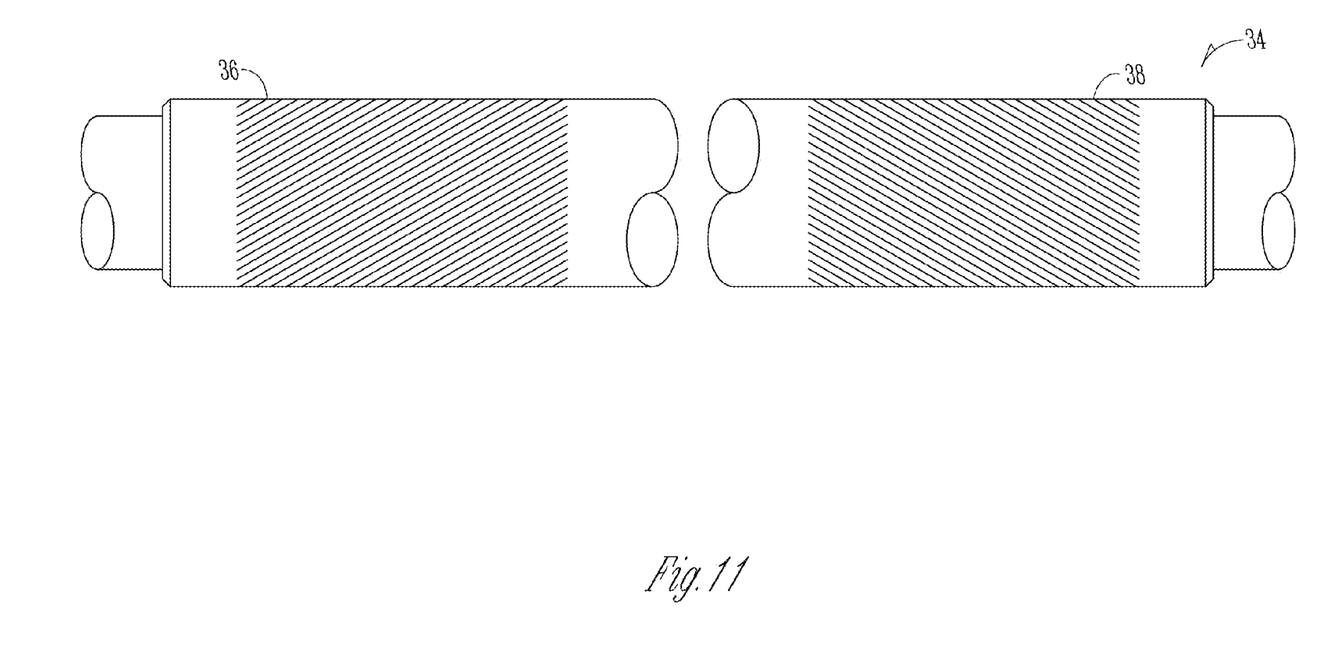
FIG. 11 is an enlarged plan fragmentary view of the shaft of FIG. 8 showing the left and right hand knurls at opposite ends of the shaft.
Figure 12:
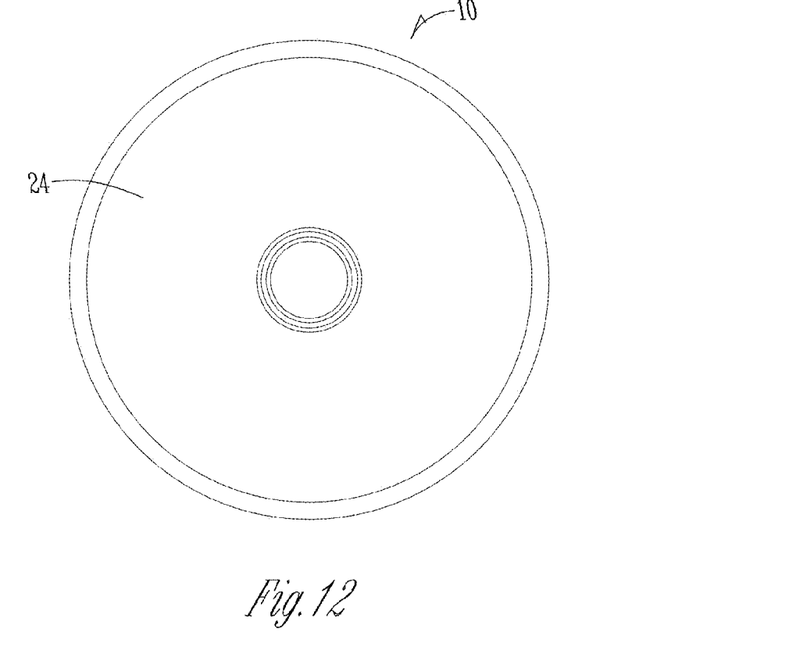
FIG. 12 is an end view of the drive roller shown in FIG. 2.
Figure 13:
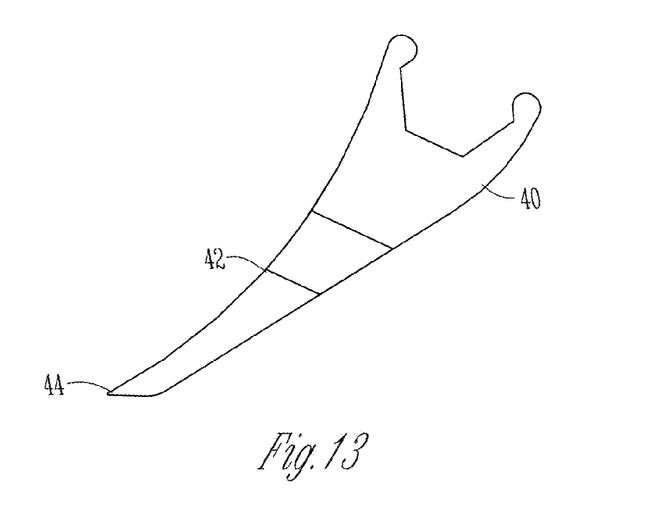
FIG. 13 is an end view of the scraper shown in FIG. 9.

The drive roller body 10 is constructed from plastic material, preferably acetal plastic and includes an axial opening in which a stainless steel shaft 34 is press fitted. The shaft 34 has opposite end portions extending outwardly of the roller body. The drive shaft 34 has left and right hand knurling 36 and 38 which functions to create a balanced resistance to movement of the shaft in opposite directions relative to the roller body. Conventional knurling will not perform this function.

In FIGS. 7, 9, 10 and 13, a scraper 40 is seen positioned closely adjacent to and along the axial length of the roller body. The scraper has inner scraper edges 42 adjacent the drive sections 20 and outer extending tongue scraper edges 44 adjacent the relief lands 22 between the drive sections 20. It is understood that the scraper edges 42 and 44 may be adjacent to or in engagement with the drive sections 20 and relief lands 22.

Figure 3:
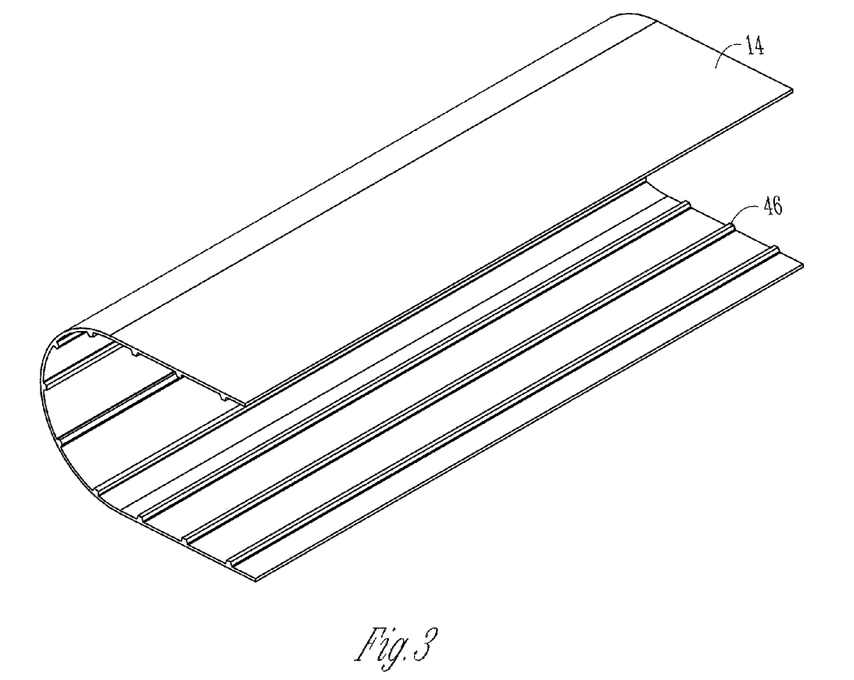
FIG. 3 shows one embodiment of a conveyor belt that may be used with the belt drive roller of this invention.
Figure 4:
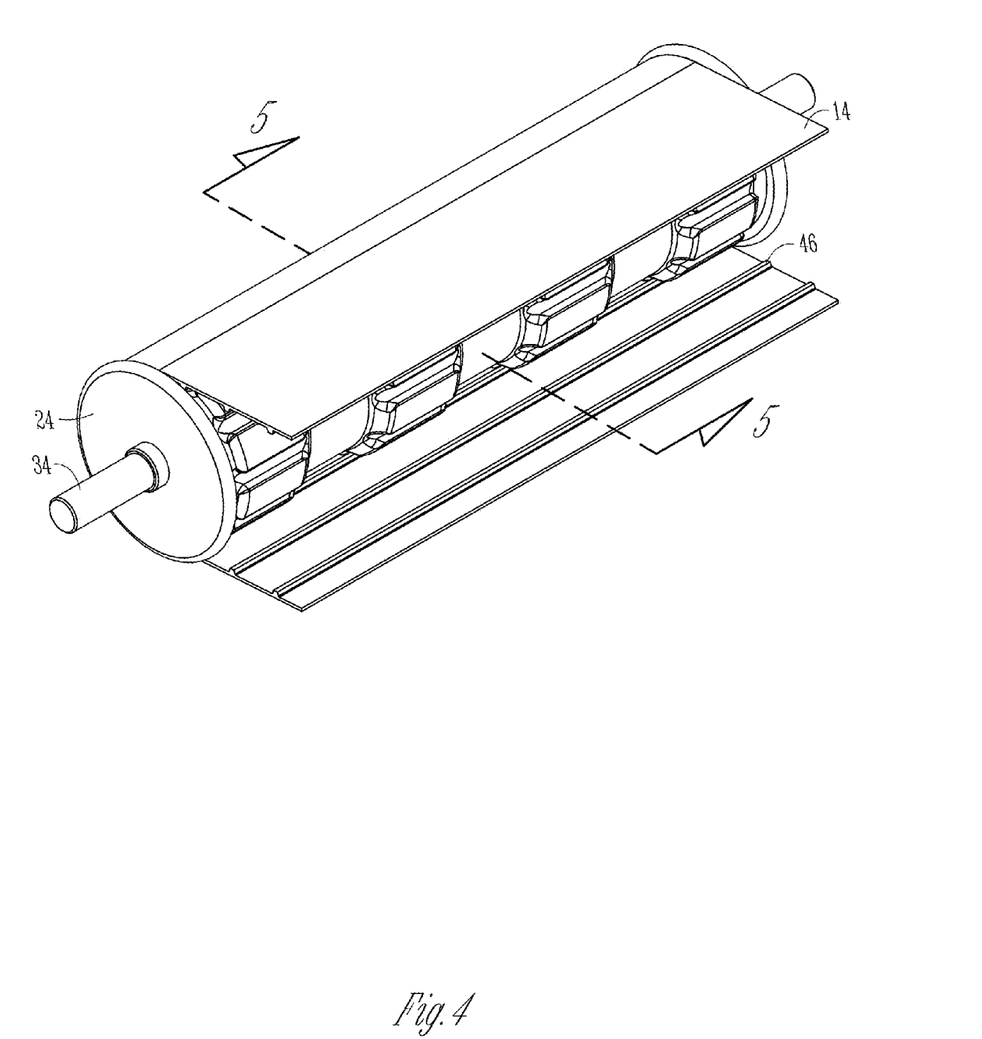
FIG. 4 perspective view of the belt drive roller of the current invention engaging a conveyor belt.
Figure 5:
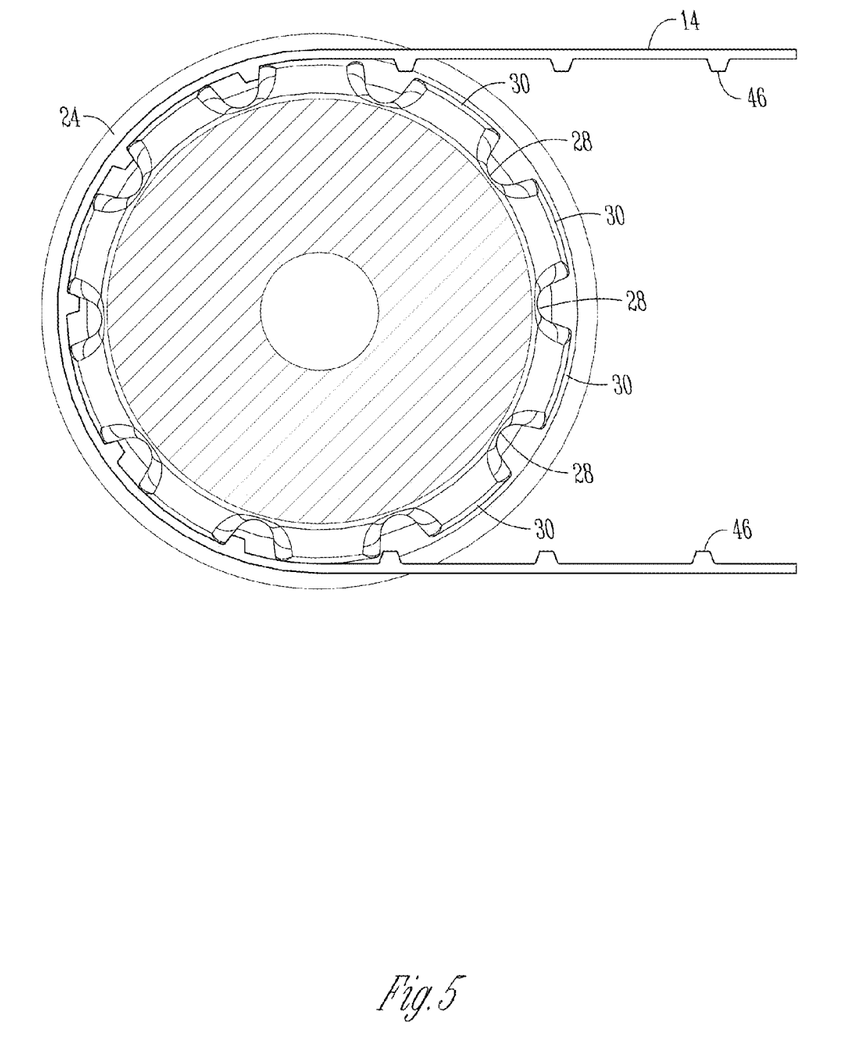
FIG. 5 shows a sectional view of the drive roller engaging the conveyor belt of FIG. 4 along lines 5-5 of FIG. 4.
Figure 6:
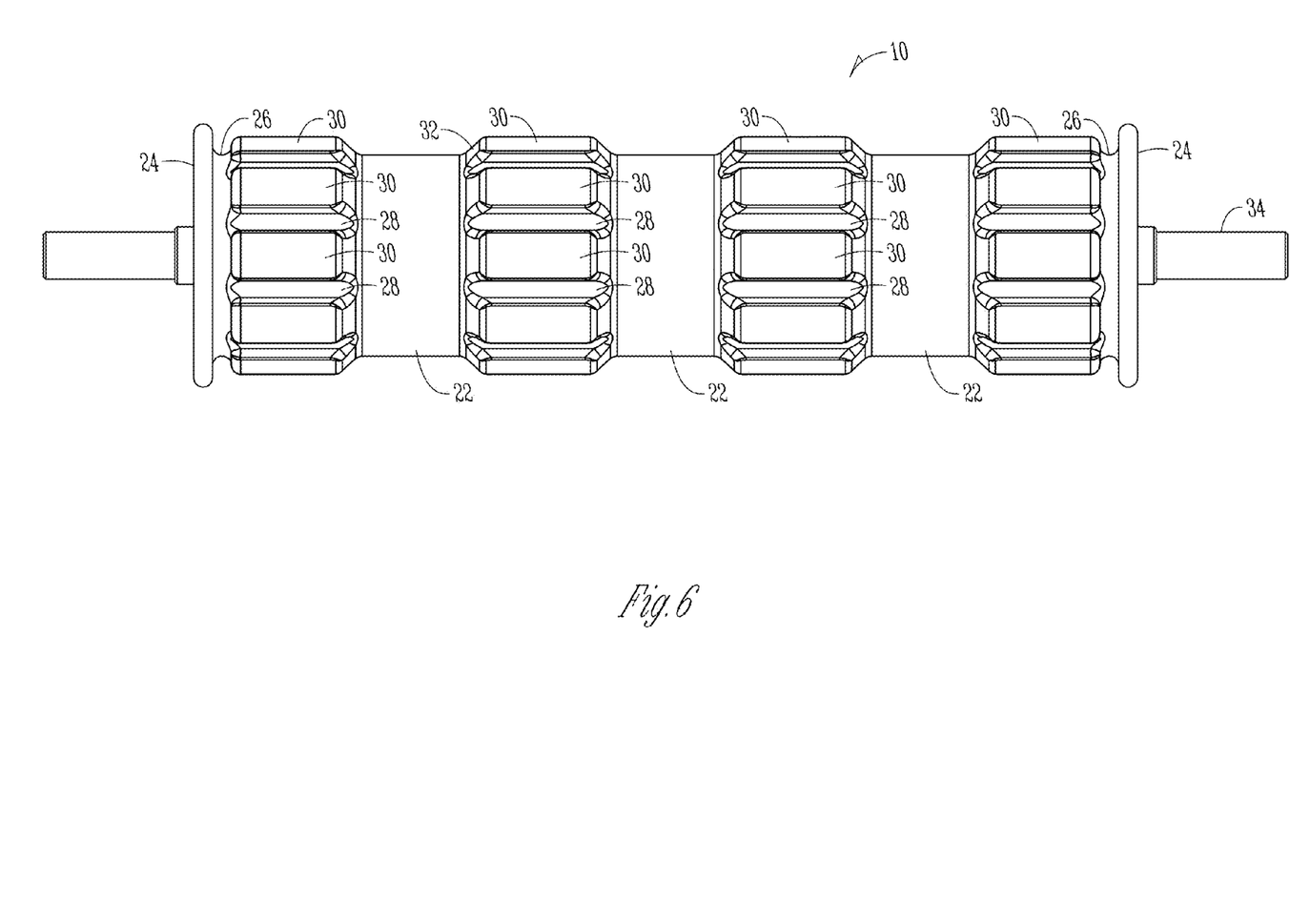
FIG. 6 is a top view of the drive roller of FIG. 2.
Figure 7:
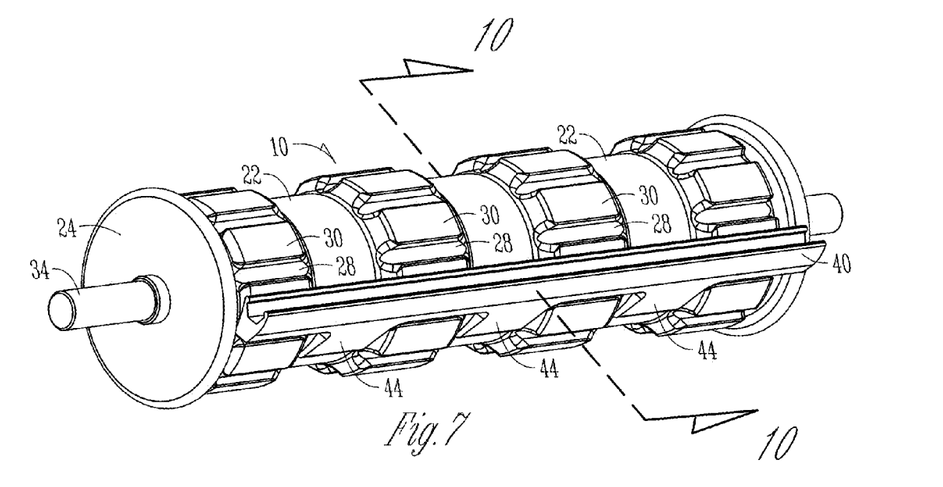
FIG. 7 is a perspective view of the drive roller engaging a scraper.

The conveyor belt 14 includes belt lugs 46 as seen in FIGS. 3 and 5 which engage the concave or U-shaped lug grooves 28 in the drive sections 20. In FIG. 5, it is seen that the belt tracking flange 24 at opposite ends of the roller serves to retain the belt 14 on the roller and restrict axial movement of the belt.

The unique design of the drive roller 10 produces substantially more rotational force for driving the belt 14 while self-cleaning any waste material that may be present by the waste material being routed from the grooves 28 to the groove opposite ends onto the relief lands 22 and 26. The acetal plastic used in the drive roller body has a smooth surface which deters adhesion of waste material.

The length of the roller 10 and thus the number of driving sections 20 and relief lands 22 therebetween may vary.

What is claimed is:

1. A roller drive pulley comprising:
   a cylindrical elongated body having an axial opening extending the length of said body;
   said body being of plastic material, an elongated metal shaft having right handed knurls on one end and left handed knurls on the opposite end; and
   said metal shaft being press fitted into said axial opening whereby said roller is stabilized on said shaft by balanced resistance against movement in either direction.

2. A roller drive pulley for driving a conveyor belt comprising;
   a cylindrical body;
   the body having a circumference; a center longitudinal axis, an outer surface and opposite ends;
   said body having a plurality of annular drive sections axially spaced apart by annular relief lands;
   said annular drive sections having circumferential spaced apart lug grooves formed by raised portions extending parallel to said body axis;
   said grooves having opposite ends communicating with an annular relief land;
   said roller body is constructed from plastic material and includes an axial opening in which a stainless steel shaft is press fitted, and said shaft having opposite end portions extending outwardly of said roller drive pulley opposite ends; and
   said stainless steel shaft portions at opposite ends of and in said roller body include knurling with the knurling at one end being left handed and the knurling at the opposite end being right handed thereby creating a balanced resistance to movement of said shaft in opposite directions.

3. The roller drive pulley of claim 2 wherein the plastic body is further defined as being acetal plastic.

4. A roller drive pulley for driving a conveyor belt comprising;
   a cylindrical body;
   the body having a circumference; a center longitudinal axis, an outer surface and opposite ends;
   said body having a plurality of annular drive sections axially spaced apart by annular relief lands;
   said annular drive sections having circumferential spaced apart lug grooves formed by raised portions extending parallel to said body axis;
   said grooves having opposite ends communicating with an annular relief land;
   each of said lug grooves are formed by circumferential spaced apart axially extending raised portions;
   each of said raised portions extend the axial length of the drive sections and have a circumferential width greater than the circumferential width of each of the adjacent lug grooves; and
   said cylindrical body opposite ends include a tracking flange spaced from said adjacent drive section by an end relief land having an axial width substantially smaller than the axial width of said relief lands between said end relief lands.

5. The roller drive pulley of claim 4 wherein said raised portions of said drive sections have end edges sloping into said adjacent relief lands between said end relief lands.

6. The roller drive pulley of claim 4 wherein a scraper is positioned closely adjacent to and along the axial length of said body, said scraper having inner scraper edges adjacent said drive sections and outer extending tongue scraper edges adjacent said relief lands between said drive sections.

* * * * *